(12) United States Patent
Motwani et al.

(10) Patent No.: US 8,943,385 B2
(45) Date of Patent: Jan. 27, 2015

(54) NAND MEMORY MANAGEMENT

(71) Applicant: Intel Corporation, Santa Clara, CA (US)

(72) Inventors: Ravi H. Motwani, San Diego, CA (US); Pranav Kalavade, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 13/658,449

(22) Filed: Oct. 23, 2012

(65) Prior Publication Data

US 2014/0115231 A1    Apr. 24, 2014

(51) Int. Cl.
*H03M 13/05* (2006.01)
*G06F 11/10* (2006.01)
*G06F 12/02* (2006.01)

(52) U.S. Cl.
CPC ............ *G06F 12/0246* (2013.01); *G06F 12/02* (2013.01)
USPC ............................ 714/763; 714/752; 714/758

(58) Field of Classification Search
USPC ........................................... 714/752, 758, 763
See application file for complete search history.

(56) References Cited

U.S. PATENT DOCUMENTS

| 3,274,611 | A * | 9/1966 | Brown et al. ................... 360/40 |
| 2012/0110411 | A1 * | 5/2012 | Cheung et al. ................ 714/758 |
| 2013/0305119 | A1 * | 11/2013 | Kern et al. .................... 714/763 |

* cited by examiner

*Primary Examiner* — Sam Rizk
(74) *Attorney, Agent, or Firm* — Caven & Aghevli LLC

(57) ABSTRACT

Apparatus, systems, and methods to manage NAND memory are described. In one embodiment, a memory controller logic is configured to apply a binary parity check code to a binary string and convert the binary string to a ternary string.

9 Claims, 7 Drawing Sheets

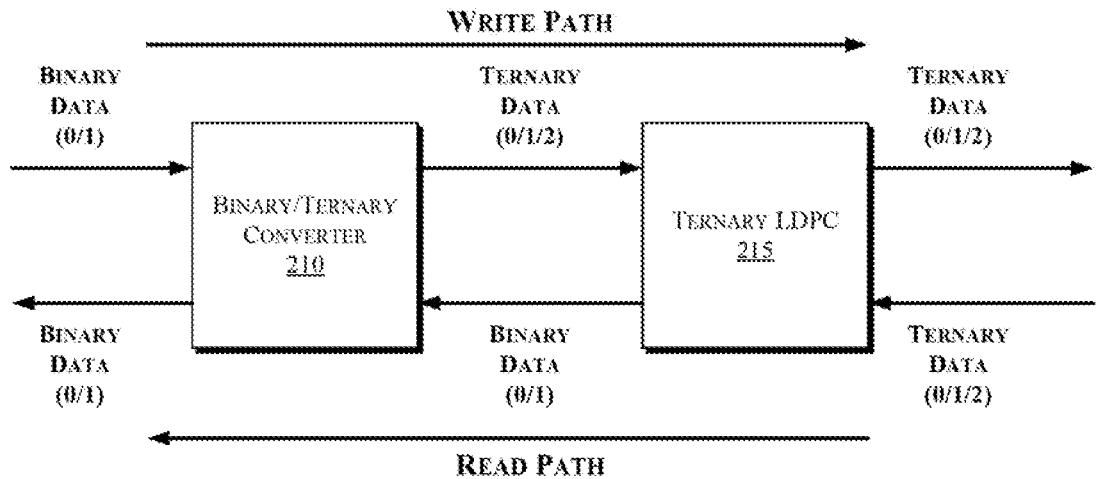
FIG. 2
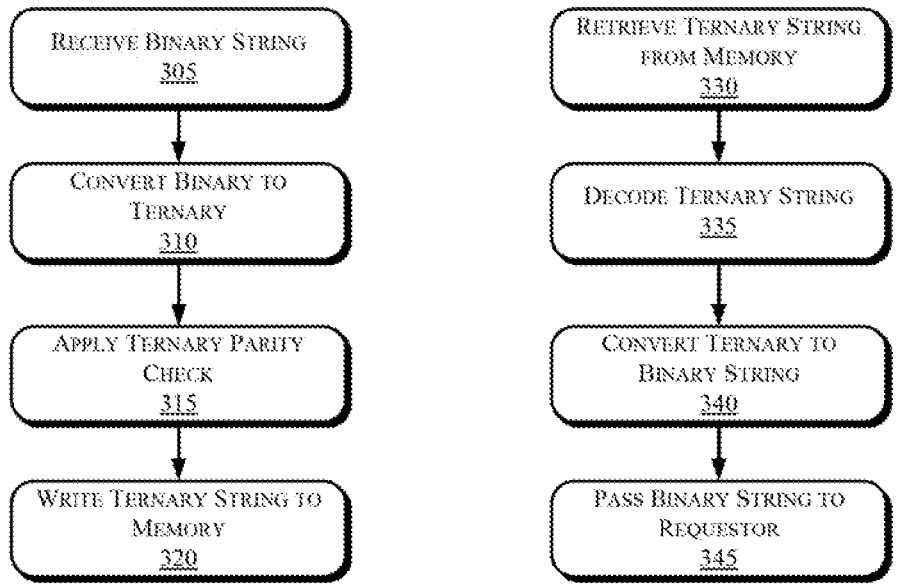
FIG. 3A
FIG. 3B

NAND MEMORY MANAGEMENT

FIELD

The present disclosure generally relates to the field of electronics. More particularly, some embodiments of the invention generally relate to error control codes and mapping techniques for three (3) level NAND flash memory.

BACKGROUND

NAND memory is a type of flash memory that is non-volatile. NAND memory may be used in memory cards, flash drives, solid-state drives, and other memory products. Flash memory has a limitation on the number of erase/rewrite cycles, before it becomes unusable, or a finite number of program-erase cycles (typically written as P/E cycles). This finite limitation is sometimes referred to as the "erase endurance" or simply as "endurance" of a flash memory device.

Flash memory may be designed using single-level cells (SLCs), which store a single bit of information in each memory cell, or as multi-level cells (MLCs), which store multiple bits of information in each memory cell. In general, single-level cells have higher endurance than multi-level cells. However, multi-level cells provide higher storage density than single-level cells.

Binary information may be mapped directly to a single-level cell memory. However, multi-level cells require memory mapping operations to map binary information onto the number of levels in the multi-level cells. Hence, techniques to manage memory mapping and error correction in multi-level NAND cells may find utility.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 2 is a schematic, block diagram illustration of components of an apparatus to implement NAND memory management in accordance with various embodiments discussed herein.

FIGS. 3A and 3B are flowcharts illustrating operations in a method implement NAND memory management in accordance with various embodiments discussed herein.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Mapping an binary string onto a NAND memory device which is programmed to n-levels, where n is a power of 2, is relatively straightforward. However, mapping a binary string onto a NAND memory device which is programmed to n-levels, where n is not a multiple of 2, raises issues with respect to both mapping and error correction. The subject matter described herein provides techniques to address both mapping and error correction issues for programming n-level NAND devices where n is not a multiple of 2.

Figure 1:
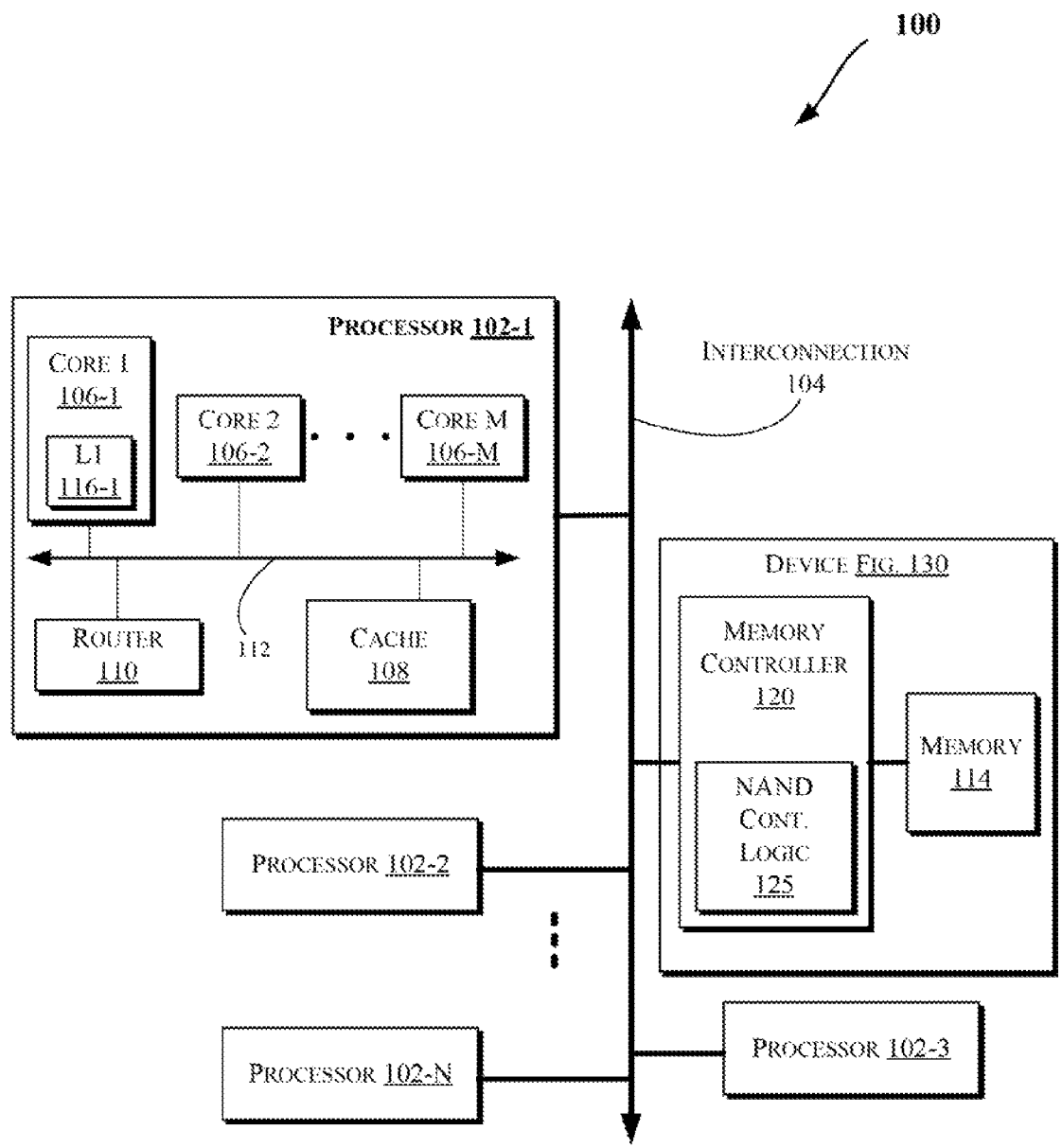
FIG. 1 is a schematic, block diagram illustration of an electronic device which may be adapted to implement NAND memory management in accordance with various embodiments discussed herein.

The techniques discussed herein may be provided in various computing systems (e.g., including smart phones, tablets, portable game consoles, etc. FIG. 1 is a schematic, block diagram illustration of an electronic device which may be adapted to implement NAND memory management in accordance with various embodiments discussed herein. Referring to FIG. 1, a system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers (such as those discussed with reference to FIGS. 8-9), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory/storage 114 for faster access by the components of the processor 102. As shown in FIG. 1, the memory/storage 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory storage 114 may be coupled to other components of system 100 through a memory controller 120. Memory/storage 114 may include flash memory such as NAND memory in some embodiments. Even though the memory controller 120 is shown to be coupled between the interconnection 102 and the memory 114, the memory controller 120 may be located elsewhere in system 100. For example, memory controller 120 or portions of it may be provided within one of the processors 102 in some embodiments. Also, in some embodiments, system 100 may include logic (e.g., NAND controller logic 125) to issue read or write requests to the memory/storage 114 in an optimal fashion, e.g., to improve flash memory reliability, including cycling endurance, program disturb, and/or charge loss over time, as will be further discussed herein. Device 130 may be embodied as a memory device such as a solid state memory device or the like or as a system on a chip (SOC) for inclusion in an electronic device such as a mobile phone or a personal computing device.

In various embodiments, memory 114 may be implemented as a 3-level NAND memory and NAND controller logic 125 implements operations to facilitate programming a 3-level NAND memory 114. A first embodiment is described with reference to FIGS. 2 and 3A-3B. FIG. 2 is a schematic, block diagram illustration of components of an apparatus to implement NAND memory management in accordance with various embodiments discussed herein. FIGS. 3A and 3B are flowcharts illustrating operations in a method implement NAND memory management in accordance with various embodiments discussed herein.

Referring to FIGS. 2 and 3A-3B, in some embodiments the NAND controller logic 125 may comprise a converter 210 to convert strings between a binary format (0/1) and a ternary format (0/1/2) and a ternary low-density parity check (LDPC) module 215. In the write path data is received (operation 305) in a binary string. At operation 310 the converter 210 converts (operation 310) the binary string to a ternary character string. The ternary data output from the converter 210 is input to an error correction module. In the embodiment depicted in FIG. 2 the error correction module 215 is implemented as a ternary low-density parity check (LDPC) module 215, which performs a parity check on the ternary data string. The output from the ternary LDPC 215 may be programmed into the NAND memory 114.

A binary to ternary mapping is a function which takes binary data and maps it to ternary symbols. In some embodiments the converter 210 implements a trivial binary to ternary mapping operation, which first obtains a decimal representation of the binary string and then converts this decimal number to its ternary representation. The compression obtained by this mapping is approximately 1.5848 which is the theoretical limit.

Trivial binary to ternary mapping suffers inherently from error propagation. For example, consider a binary string (000 . . . 001111 which is to be stored. The decimal representation of this string is 15 and the ternary representation is 000 . . .

00120, which is stored as level information in NAND cells. If there is an error on reading the ternary information from the cells, e.g., if 0000 . . . 00121, so the last level 0 is readout as level 1. The binary representation for this noisy readout is 000 . . . 0010000. Hence an error reading a single level in the NAND memory translates to 5 bits in error in the resulting binary character string. The trivial mapping results in an error propagation by a factor of 3.5, which means that the bit error rate is 3.5× the level error rate.

In the read path ternary data retrieved (operation 330) from the NAND memory 114 is input to the ternary LDPC 215, which decodes (operation 335) the data and performs a parity check on the ternary data. The binary data output by the ternary LDPC 215 is input to the converter 210, which converts (operation 340) the ternary string to a binary string. The binary string may then be passed to the requestor (operation 345). Because error correction is performed on the ternary data (i.e., in the error free domain), read errors are corrected before the ternary data is converted to binary data. This eliminates, or at least reduces, the inherent error propagation associated with trivial binary to ternary mapping described above.

Thus, in some the embodiments depicted in FIGS. 2 and 3A-3B provide an apparatus comprising a memory controller logic to convert a binary string to a ternary string, and apply a ternary parity check code to the ternary string. The apparatus comprises logic to write the ternary string to a 3-level NAND memory. In some embodiments the logic to convert a binary string to a ternary string applies a trivial binary to ternary mapping function. The apparatus further comprises logic to read the ternary string from the 3-level NAND memory, decode a ternary string read from the 3-level NAND memory and convert the ternary string to a binary string. In some embodiments the apparatus may comprise one or more processor cores are coupled to the memory controller logic to access data stored in the 3-level NAND memory.

In some embodiments the embodiments depicted in FIGS. 2 and 3A-3B provide a system comprising a 3-level NAND memory device having a plurality of memory cells, a processor to access the 3-level NAND memory device, and a 3-level NAND memory controller logic to convert a binary string to a ternary string and apply a ternary parity check code to the ternary string. In some embodiments the system of may comprise logic to write the ternary string to the 3-level NAND memory, to convert a binary string to a ternary string applies a trivial binary to ternary mapping function, to read the ternary string from the 3-level NAND memory, decode a ternary string read from the 3-level NAND memory and convert the ternary string to a binary string.

In some embodiments the embodiments depicted in FIGS. 2 and 3A-3B provide a method comprising converting a binary string to a ternary string and applying a ternary parity check code to the ternary string. The method may further comprise writing the ternary string to a 3-level NAND memory, applying a trivial binary to ternary mapping function to the binary string, decoding a ternary string read from the 3-level NAND memory, and converting the ternary string to a binary string.

Figure 4:
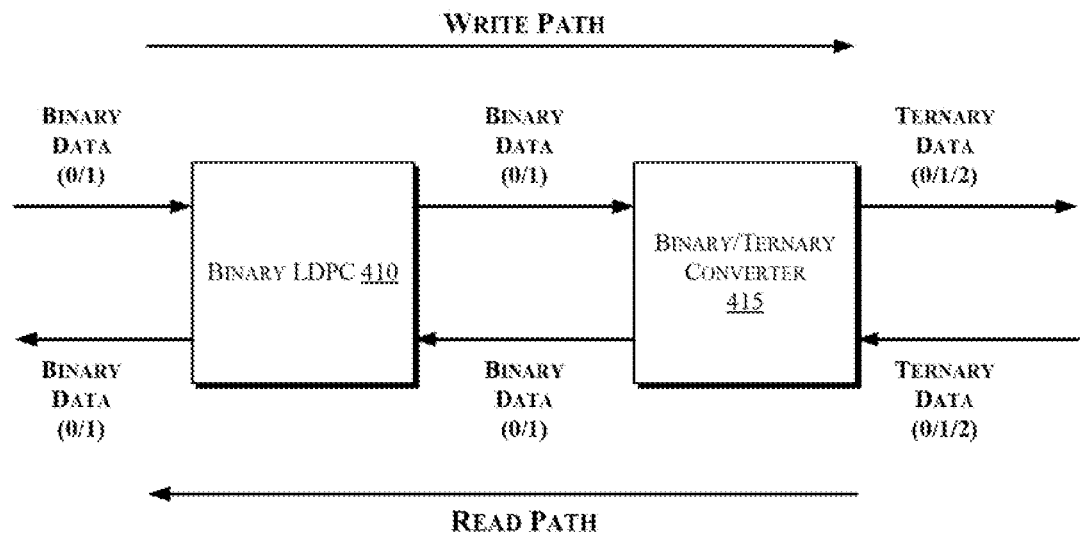
FIG. 4 is a schematic, block diagram illustration of components of an apparatus to implement NAND memory management in accordance with various embodiments discussed herein.
Figures 5A, 5B:
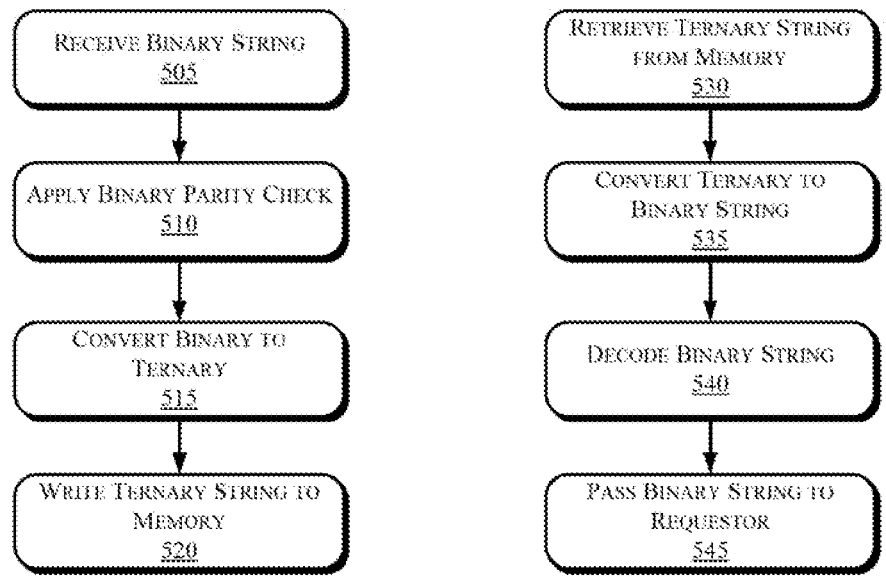
FIGS. 5A and 5B are flowcharts illustrating operations in a method to implement NAND memory management in accordance with various embodiments discussed herein.

A second embodiment is described with reference to FIGS. 4 and 5A-5B. FIG. 4 is a schematic, block diagram illustration of components of an apparatus to implement NAND memory management in accordance with various embodiments discussed herein. FIGS. 5A and 5B are flowcharts illustrating operations in a method to implement NAND memory management in accordance with various embodiments discussed herein.

Referring to FIGS. 4 and 5A-5B, in some embodiments the NAND controller logic 125 may comprise a binary low-density parity check (LDPC) module 410. In the write path data is received (operation 505) in a binary string. At operation 510 the binary LDPC 410 applies (510) a parity check on the binary data string. The output of the binary LDPC 410 is input to a binary/ternary converter 415, which converts (operation 515) the binary string to a ternary character string. The ternary data output from the converter 415 programmed (operation 520) into the NAND memory 114.

In the read path ternary data retrieved (operation 530) from the NAND memory 114 is input to the converter 415, which converts (operation 535) the ternary string to a binary string. The output of the converter 415 is input to the binary LDPC 410, which decodes (operation 540) the data and performs a parity check on the ternary data. The binary data output by the binary LDPC 215 may then be passed to the requestor (operation 545).

In some embodiments the converter implements a binary ternary mapping operation which maps 11 binary bits to 7 ternary symbols to provide a compression of (11/7), or approximately 1.571. Error propagation is controlled by the design of the mapping between an 11 bit binary string and a 7 symbol ternary string. The mapping is designed under the constraint that if the Hamming distance (i.e., the number of positions at which the strings are different) in the ternary domain is 1, then the Hamming distance of the corresponding binary images should also be 1. This constraint ensures that if the level information has read errors, the errors are not over-amplified by the ternary-binary mapping in the read path.

One embodiment of a method to provide a mapping between an 11 bit binary string to a 7 ternary symbol string is described with reference to FIGS. 6-7. In some embodiments the binary/ternary converter may implement a mapping tree 700 to provide a mapping between an 11 bit binary string and a 7 symbol ternary string. An 11 bit binary string allows 2048 ($2^{11}$) combinations, while 7 ternary symbols allow 2187 ($3^7$) combinations. Therefore, of these 2187 ternary combinations, only 2048 possibilities can be included in the mapping tree; the other 139 ternary combinations need to be eliminated.

Figure 6:
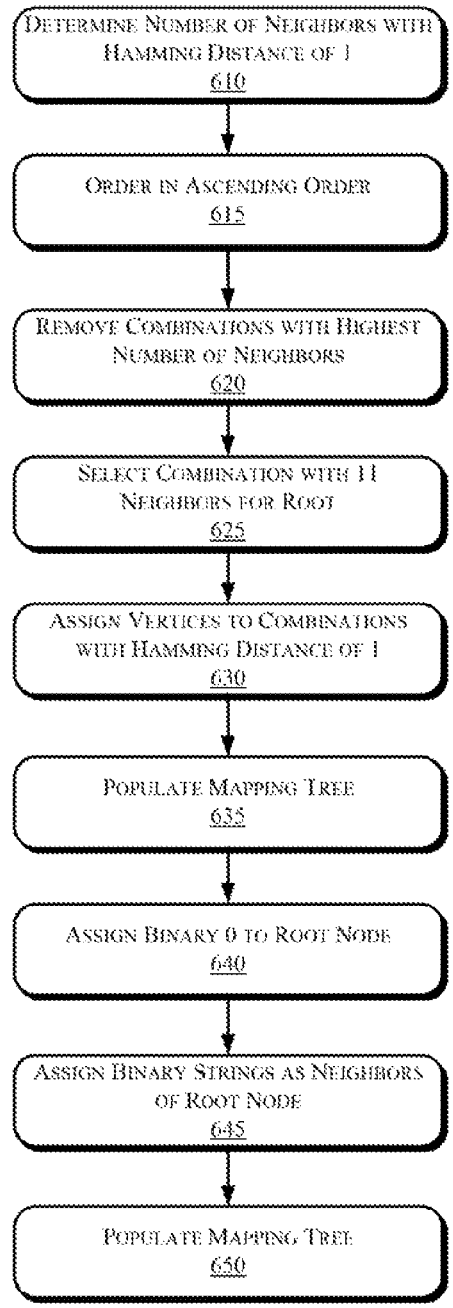
FIG. 6 is a flowchart illustrating operations in a method to implement NAND memory management in accordance with various embodiments discussed herein.
Figure 7:
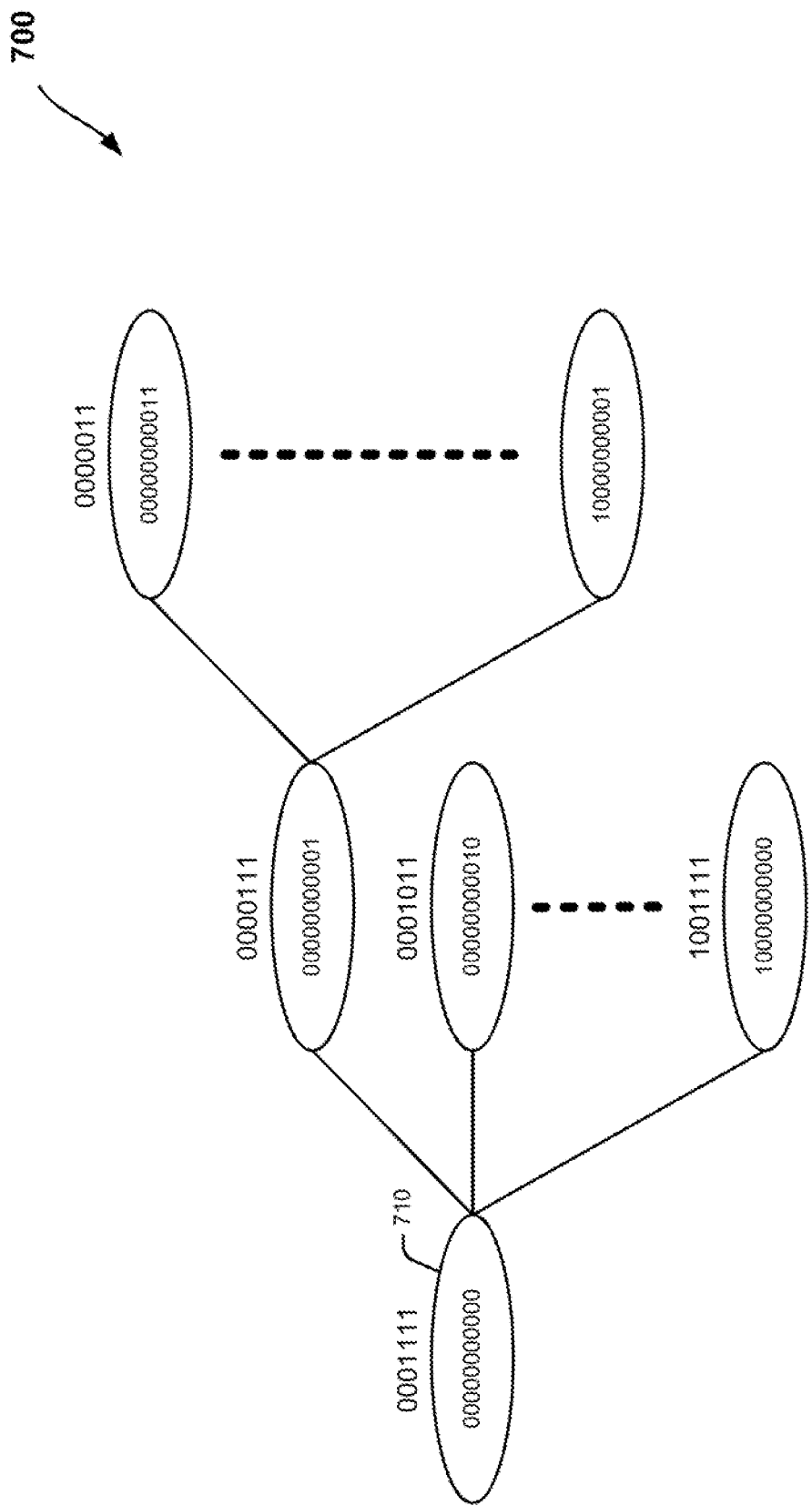
FIG. 7 is a schematic, block diagram of a mapping tree to implement NAND memory management in accordance with various embodiments discussed herein.

Referring to FIG. 6, at operation 610 for each of the 2187 ternary combinations the number of neighbors with a Hamming distance of 1 is determined. At operation 615 the ternary combinations are arranged in ascending order of the number of neighbors with a Hamming distance of 1, and at operation 620 the 139 combinations with the highest number of neighbors with a Hamming distance of 1 are removed. This leaves a total of 2048 ternary combinations to match a total of 2048 binary combinations, so a 1-1 matching can be established by a mapping tree.

At operation 625 a ternary combination which has 11 neighbors is selected as the root node 710, and at operation 630 vertices are assigned to all ternary combinations having a Hamming distance of 1 from the ternary combination selected as the root. At operation 635 the mapping tree is populated iteratively until all 2048 remaining combinations are exhausted, thereby completing the ternary symbol portion of the mapping tree.

Once the ternary combinations are positioned on the mapping tree the binary combinations may be assigned to the nodes of the mapping tree. Thus, at operation 640 the binary 0 combination is assigned to the root node 710. At operation 645 the binary strings with a single 1 are assigned to the 11 vertices connected to the root node 710. At operation 650 the mapping tree is populated by assigning the binary labels with 2-ones to the next set of vertices and making the assignment such that the Hamming distance of 1 is attained. If a Hamming distance of 1 is not possible, choose the best possible binary label with Hamming distance 2 if possible. This process is repeated until the mapping tree is populated.

Figure 8:
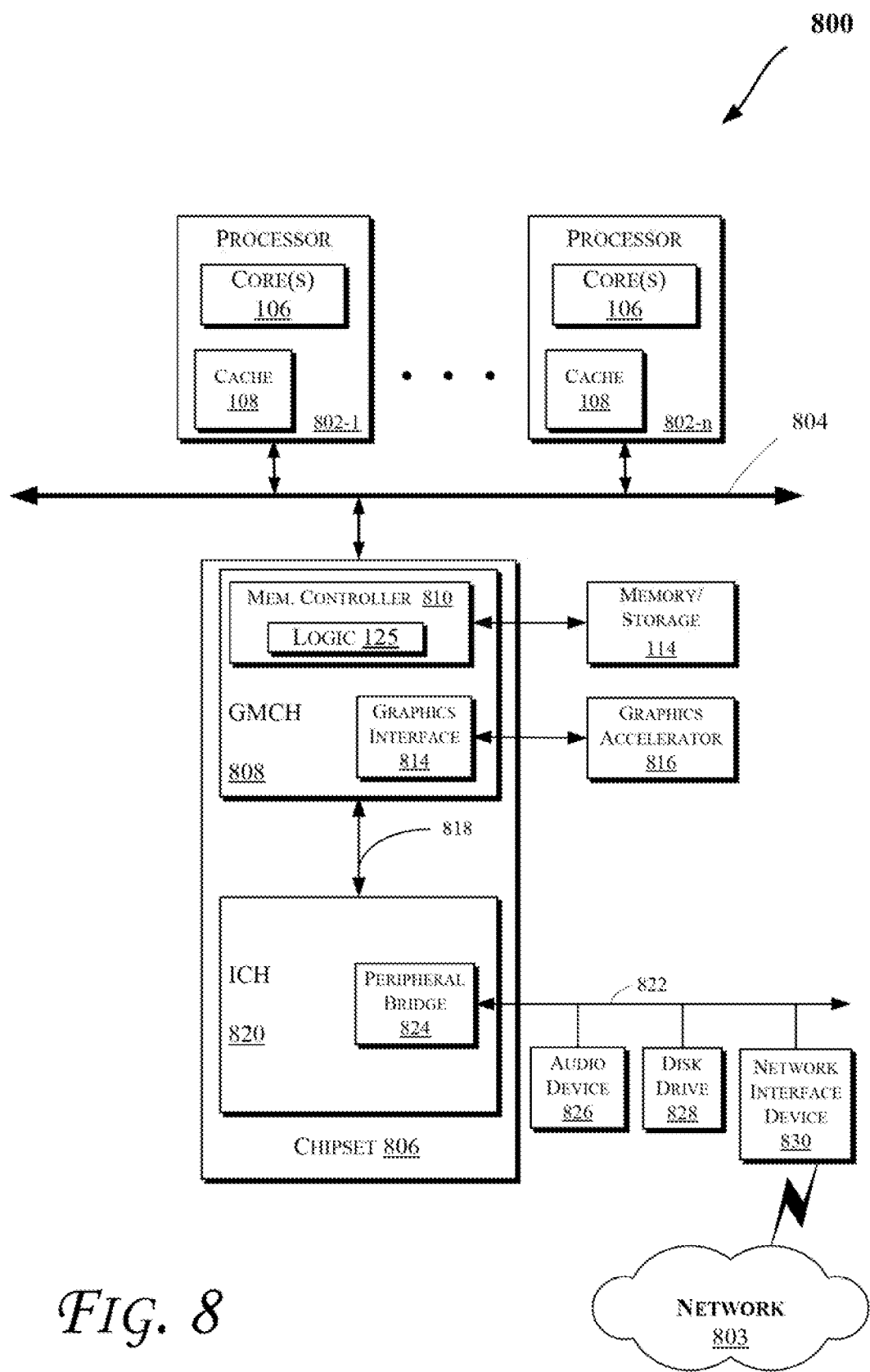
FIG. 8 is a schematic, block diagram illustration of an electronic device which may be adapted to implement NAND memory management in accordance with various embodiments discussed herein.

FIG. 8 illustrates a block diagram of a computing system 800 in accordance with an embodiment of the invention. The computing system 800 may include one or more central processing unit(s) (CPUs) 802 or processors that communicate via an interconnection network (or bus) 804. The processors 802 may include a general purpose processor, a network processor (that processes data communicated over a computer network 803), an application processor (such as those used in cell phones, smart phones, etc.), or other types of a processor (including a reduced instruction set computer (RISC) processor or a complex instruction set computer (CISC)). Various types of computer networks 803 may be utilized including wired (e.g., Ethernet, Gigabit, Fiber, etc.) or wireless networks (such as cellular, 3G (Third-Generation Cell-Phone Technology or 3rd Generation Wireless Format (UWCC)). 4G, Low Power Embedded (LPE), etc.). Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors.

In an embodiment, one or more of the processors 802 may be the same or similar to the processors 102 of FIG. 1. For example, one or more of the processors 802 may include one or more of the cores 106 and/or cache 108. Also, the operations discussed with reference to FIGS. 1-7 may be performed by one or more components of the system 800.

A chipset 806 may also communicate with the interconnection network 804. The chipset 806 may include a graphics and memory control hub (GMCH) 808. The GMCH 808 may include a memory controller 810 (which may be the same or similar to the memory controller 120 of FIG. 1 in an embodiment, e.g., including the logic 125) that communicates with the memory 114. The memory 114 may store data, including sequences of instructions that are executed by the CPU 802, or any other device included in the computing system 800. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or NAND based solid-state drive. Additional devices may communicate via the interconnection network 804, such as multiple CPUs and/or multiple system memories.

The GMCH 808 may also include a graphics interface 814 that communicates with a graphics accelerator 816. In one embodiment of the invention, the graphics interface 814 may communicate with the graphics accelerator 816 via an accelerated graphics port (AGP). In an embodiment of the invention, a display (such as a flat panel display) may communicate with the graphics interface 814 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 818 may allow the GMCH 808 and an input/output control hub (ICH) 820 to communicate. The ICH 820 may provide an interface to I/O devices that communicate with the computing system 800. The ICH 820 may communicate with a bus 822 through a peripheral bridge (or controller) 824, such as a peripheral component interconnect (PCI) bridge, a universal serial bus (USB) controller, or other types of peripheral bridges or controllers. The bridge 824 may provide a data path between the CPU 802 and peripheral devices. Other types of topologies may be utilized. Also, multiple buses may communicate with the ICH 820, e.g., through multiple bridges or controllers. Moreover, other peripherals in communication with the ICH 820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 822 may communicate with an audio device 826, one or more drive(s) 828, which may be embodied as a disk drive or a solid state drive, and a network interface device 830 (which is in communication with the computer network 803). Other devices may communicate via the bus 822. Also, various components (such as the network interface device 830) may communicate with the GMCH 808 in some embodiments of the invention. In addition, the processor 802 and the GMCH 808 may be combined to form a single chip. Furthermore, the graphics accelerator 816 may be included within the GMCH 808 in other embodiments of the invention.

Furthermore, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (which may be a magnetic hard disk drive or a NAND flash memory based solid state drive) (e.g., 828), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 9:
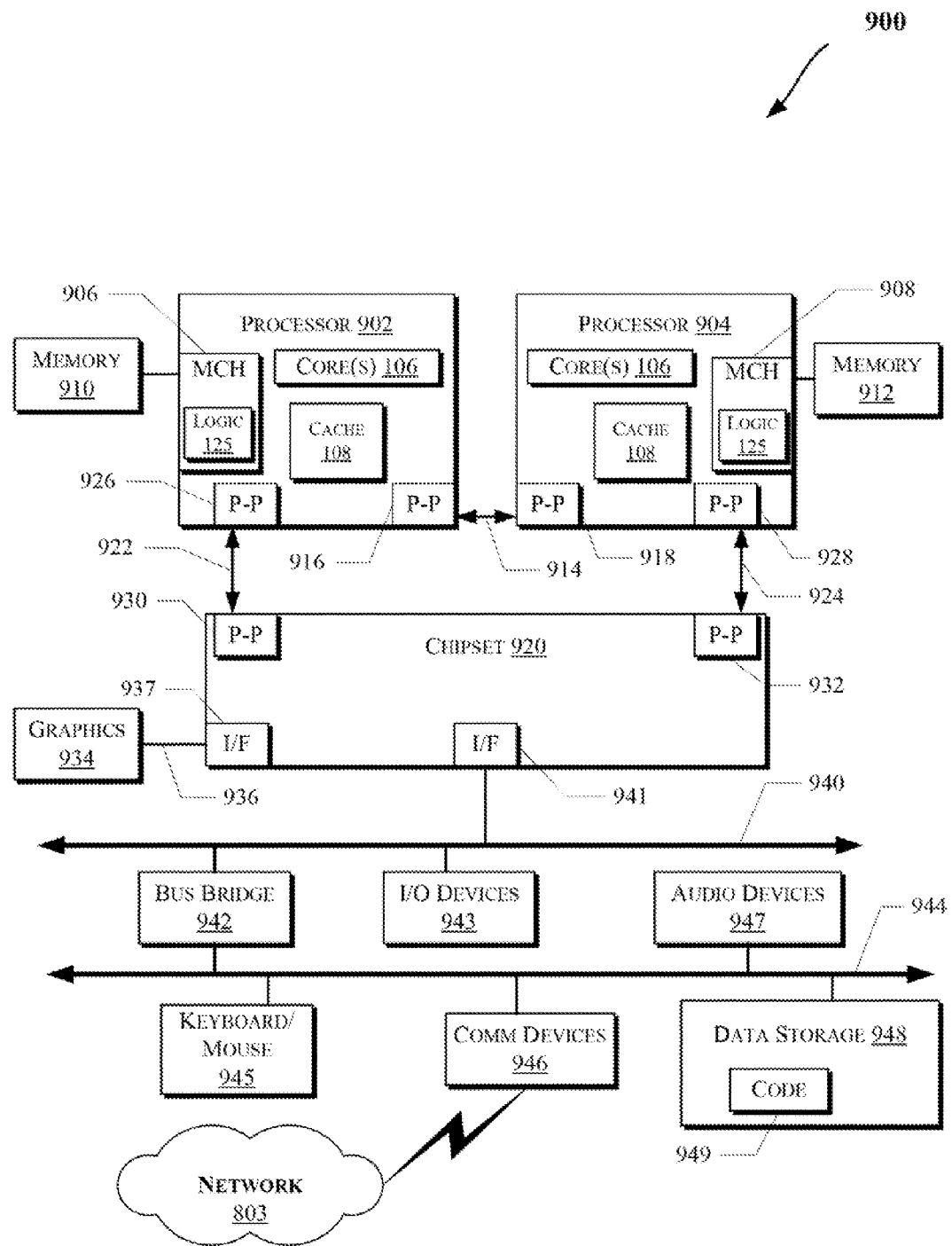
FIG. 9 is a schematic, block diagram illustration of an electronic device which may be adapted to implement NAND memory management in accordance with various embodiments discussed herein.

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-8 may be performed by one or more components of the system 900.

As illustrated in FIG. 9, the system 900 may include several processors, of which only two, processors 902 and 904 are shown for clarity. The processors 902 and 904 may each include a local memory controller hub (MCH) 906 and 908 to enable communication with memories 910 and 912. The memories 910 and/or 912 may store various data such as those discussed with reference to the memory 114 of FIGS. 1 and/or 8. Also, MCH 906 and 908 may include the memory controller 120 and/or logic 125 of FIG. 1 in some embodiments.

In an embodiment, the processors 902 and 904 may be one of the processors 802 discussed with reference to FIG. 8. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

As shown in FIG. 9, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-9.

Although the embodiments described herein is directed to binary to ternary mapping, one skilled in the art will recognize that the techniques may be adapted for binary to n-ary mapping, where n may be 5, 7, 9 or any non-trivial mapping between binary to n-ary.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a memory controller logic to:
apply a binary parity check code to a binary string; and convert the binary string to a ternary string
determine, for each ternary combination in a set of 2187 ternary combinations, a number of neighbors which have a hamming distance of 1 from the ternary combination;
order the set of 2187 ternary combinations in ascending order of the number of neighbors which having a hamming distance of 1;
remove from the set of 2187 ternary combinations a subset of 139 ternary combinations to produce a set of 2048 ternary combinations;
select as a root a ternary combination which has 11 neighbors;
assign vertices for all ternary combinations which have a hamming distance of 1 from the root;
iteratively populate the mapping tree with nodes having a hamming distance of 1 from their respective neighbors.

2. The apparatus of claim 1, further comprising logic to write the ternary string to a 3-level NAND memory.

3. The apparatus of claim 1, further comprising logic to:
assign a binary 0 string to the root node;
assign binary strings which have a single 1 to the 11 neighbors of the root node; and
iteratively assign binary strings which have a hamming distance of 1 to the vertices of each node in the mapping tree.

4. The apparatus of claim 1 wherein one or more processor cores are coupled to the memory controller logic to access data stored in the 3-level NAND memory.

5. A system comprising:
a 3-level NAND memory device having a plurality of memory cells;
a processor to access the 3-level NAND memory device; and
a 3-level NAND memory controller logic to:
apply a binary parity check code to a binary string; and convert the binary string to a ternary string
determine, for each ternary combination in a set of 2187 ternary combinations, a number of neighbors which have a hamming distance of 1 from the ternary combination;
order the set of 2187 ternary combinations in ascending order of the number of neighbors which having a hamming distance of 1;
remove from the set of 2187 ternary combinations a subset of 139 ternary combinations to produce a set of 2048 ternary combinations;
select as a root a ternary combination which has 11 neighbors;
assign vertices for all ternary combinations which have a hamming distance of 1 from the root;
iteratively populate the mapping tree with nodes having a hamming distance of 1 from their respective neighbors.

6. The system of claim 5, further comprising logic to write the ternary string to the 3-level NAND memory.

7. The system of claim 5, further comprising logic to:
assign a binary 0 string to the root node;
assign binary strings which have a single 1 to the 11 neighbors of the root node; and
iteratively assigning binary strings which have a hamming distance of 1 to the vertices of each node in the mapping tree.

8. A computer-implemented method comprising:
applying a binary parity check code to a binary string; and
converting the binary string to a ternary string
determining, for each ternary combination in a set of 2187 ternary combinations, a number of neighbors which have a hamming distance of 1 from the ternary combination;
ordering the set of 2187 ternary combinations in ascending order of the number of neighbors which having a hamming distance of 1;
removing from the set of 2187 ternary combinations a subset of 139 ternary combinations to produce a set of 2048 ternary combinations;
selecting as a root a ternary combination which has 11 neighbors;
assigning vertices for all ternary combinations which have a hamming distance of 1 from the root
Iteratively populating the mapping tree with nodes having a hamming distance of 1 from their respective neighbors; and
writing the ternary string to a 3-level NAND memory.

9. The method of claim 8, further comprising:
assigning a binary 0 string to the root node;
assigning binary strings which have a single 1 to the 11 neighbors of the root node; and
iteratively assigning binary strings which have a hamming distance of 1 to the vertices of each node in the mapping tree.

* * * * *